April 23, 1968 — R. L. STEDFELD — 3,379,336
SELF-SEALING TANK
Filed Nov. 30, 1966
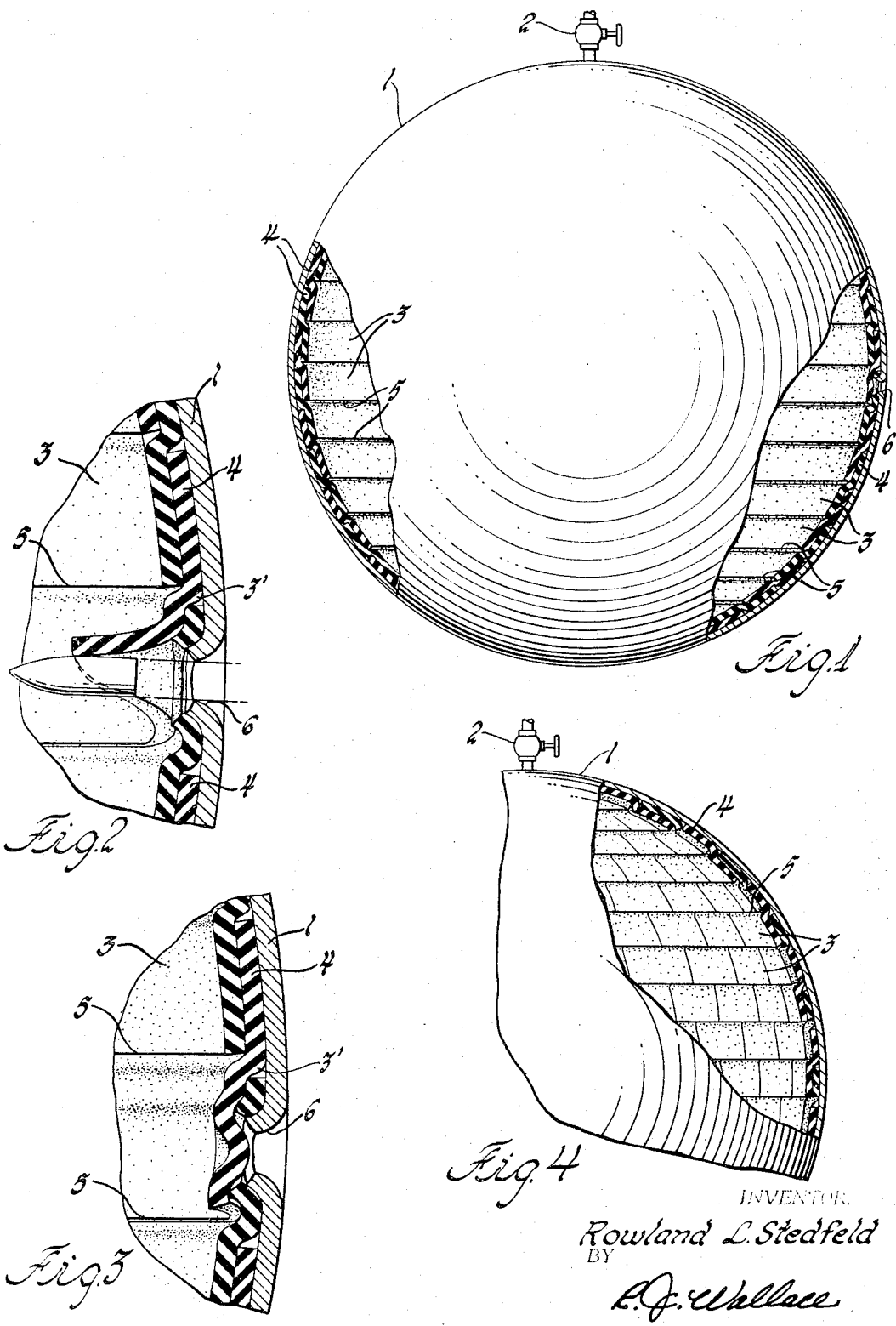
INVENTOR.
Rowland L. Stedfeld
BY
R. J. Wallace
ATTORNEY

United States Patent Office 3,379,336
Patented Apr. 23, 1968

3,379,336
SELF-SEALING TANK
Rowland L. Stedfeld, Indianapolis, Ind., assignor to General Motors Corporation, Detroit, Mich., a corporation of Delaware
Filed Nov. 30, 1966, Ser. No. 597,930
7 Claims. (Cl. 220—63)

ABSTRACT OF THE DISCLOSURE

This invention relates generally to fluid storage vessels. More specifically, the invention is directed toward fluid storage vessels having improved self-sealing means. Herein is disclosed and claimed a self-sealing vessel comprising principally the vessel itself and a plurality of pendant rubber-like flaps affixed to the vessel's inner wall. The aforesaid flaps move in response to a differential pressure occurring across them incident to the occurrence of a leak in the immediate vicinity of the flap, thus ultimately covering or plugging the leak.

---

For applications such as fuel tanks for military vehicles, which are subject to puncture or rupture by bullets or shrapnel, and storage vessels for toxic or corrosive chemicals (i.e., $Cl_2$) it is desirable to provide a means for quickly and effectively plugging any leaks which might occur in the walls of the vessel.

It is, therefore, an object of my invention to provide a new and improved self-sealing vessel.

It is still a further object of my invention to provide a sealing means within a vessel which means moves to seal any leaks occurring in the vessel, the movement of the sealing means being in response to a differential pressure occurring across the means incident to the occurrence of a leak in the immediate vicinity of the sealing means.

These and other objects and advantages of my invention will become more apparent from the detailed description which follows.

Briefly stated, my invention comprises a plurality of elastomeric flap-like sealing members affixed to the inner wall of a fluid storage vessel which members substantially conform into the inner surface of the vessel. The elastomeric flaps will cover simple leaks or deform to fill larger punctures in the vessel's wall. The differential pressure across the vessel wall at the situs of the leak is generally sufficient to hold the sealing member in place, hence plugging the leak.

FIGURE 1 shows a partially sectioned front elevation of one embodiment of my invention.

FIGURE 2 shows an exploded sectioned view of my invention while being punctured.

FIGURE 3 shows an exploded sectioned view of the sealing mechanism of my invention.

FIGURE 4 shows a partially sectioned front elevation of a portion of another embodiment of my invention.

Though I am primarily interested in high pressure vessels for containing liquids under pressure such as liquid $Cl_2$, I do not intend to limit myself thereto. However, my invention is particularly effective in vessels which are pressurized (i.e., a pressure of at least 0.5 p.s.i. in excess of the ambient pressure) as they tend to create greater differential pressures across the walls of the vessels, thereby aiding in the effectiveness of my invention. In nonpressurized vessels, of course, a differential pressure is also created across the walls of the vessel owing to the head of liquid above the leak or puncture. However, in cases where the leak is quite high on the unpressurized vessel and hence the liquid head low, the liquid head may be insufficient to close the flap. Likewise, in the absence of pressure, when the leak is even higher on the vessel so as to be above the liquid level in the vessel, no sealing is effected and the vapor or gas may leak through the hole. Hence, I prefer to use my invention in a pressurized vessel. In a pressurized vessel even leaks occurring above the liquid level in the vessel will be sealed by my invention.

FIGURES 1 and 4 show the preferred embodiments of my invention and are disclosed herein primarily in conjunction with a vessel for containing liquid chlorine which is subsequently used as an oxidant in a fuel cell (e.g., $Li/LiCl/Cl_2$). The high toxicity and corrosiveness of chlorine has necessitated the use of safety measures such as my invention.

FIGURE 1 shows a spherical storage tank 1 having an outlet valve 2 through which the chlorine gas is conducted to the place of its use (e.g., a fuel cell). On the inner surface of the sphere 1 are a plurality of annular elastomeric sealing members 3. The annular sealing members have their one upper edge 4 fixed to the inner wall of the sphere 1. Any of a variety of ways for fixing the sealing members to the wall may be employed. I currently prefer to spot weld a plurality of staples to the wall of the vessel, affix the sealing members to the staples by piercing the members with the staples' prongs, and subsequently securing the members in place by bending over the prongs. 316 Stainless Steel Staples are adequate for this purpose. The exact means for fixing the seals to the vessel's wall can vary and will be often dictated by the material stored in the vessel. The other or lower edge of the annular sealing member 3 is permitted to hang free as would a flap. The respective annular sealing members 3 are so arranged as to overlap one with the other. This overlapping insures that the entire inner surface of the sphere is protected. It is necessary that the flap portion of one member overlaps at least the wall-attached portion of the succeeding member. It is preferred that each sealing member 3 overlaps the next succeeding sealing member 3 by at least one half in order that a double thickness seal may be effected in the case of a puncture. This overlapping of one sealing member with the other also insures an adequate seal in case the puncture were to occur at a point where one of the sealing members was joined to the inner surface of the sphere and hence also possibly punctured (see FIGS. 2 and 3). When thusly punctured the free end of the elastomeric sealing member adjacent the hole will deform rather than be pierced (see FIG. 2) yet resiliently return to its original position with the passing of the projectile or the removal of the puncturing implement (see FIG. 3). In the case of such a puncture as illustrated at hole 6 in the wall of the sphere 1, at least one of the sealing members 3, here 3', deforms to plug or patch the hole. Simple leaks such as cracks in the vessel walls require less deformation of the sealing member than do the larger holes and often a simple covering of the leak is sufficient.

FIGURE 4 shows a liquid chlorine storage vessel comprising a sphere 1, a valve 2 and having a plurality of elastomeric sealing members 3 arranged in a shingle-like fashion about the inner wall of the vessel. The respective sealing members 3 have their upper edge 4 affixed to the inner surface of the sphere 1 and their lower edges 5 free. In this embodiment the upper edge 4 need not necessarily be cut into smaller sections as has been done to the flap portions. Hence, the portion 4 affixed to the wall may be a continuous piece of material much like the annular sealing members 3 of FIGURE 1. As in the case of the sealing members of FIGURE 1, I prefer that the respective rows of sealing members overlap the immediately successive row by at least one half. By shingle-like manner, I mean an arrangement wherein each successive row overlaps the immediately preceding row and wherein each member 3 of each row overlaps the junctions of the members 3 of the preceding row.

The composition of the materials which can be used as the sealing members of my invention, of course, are dependent upon the nature of the environment and/or the materials to be stored. The principal requirement is, however, that the material be elastomeric in nature. By elastomeric I mean those properties of a material which resemble those of soft rubber including the properties of resiliency, suppleness, elasticity, flexibility, plasticity, pliantness and adaptability. Hence, in the case of liquid chlorine, I prefer to use the homopolymer known generally as FEP-fluorocarbon or more specifically under the trademark Teflon (FEP) owned by E. I. du Pont de Nemours. Teflon-FEP is a high molecular weight copolymer of tetrafluoroethylene and hexafluoropropylene. Other fluorocarbons may also be used such as polychlorotrifluoroethylene (CTFE resin) sold under the name KEL–F, a trademark belonging to Minnesota Mining & Manufacturing Co. Likewise, tetrafluoroethylene (TFE) polymers may be used. They are sold under the name Teflon (TFE), a trademark owned by E. I. dn Pont de Nemours. In the case of gasoline neoprene, Teflon, buna-N or buna-S would be satisfactory. The materials used are not deemed to be significant as long as they are compatible with the system in which they are being used. Likewise, the dimensions of the individual sealing members are not deemed to be material, as long as they are sufficiently rubber-like to effect the seal. In this connection flaps having the principal dimensions of about 1" x 1" are satisfactory. However, any of a variety of sizes and shapes are equally effective. In fact, in those parts of the vessel where the rounding and contouring is greatest (i.e., the ends) trapezoidal shaped members are desirable. The thickness may vary with the pressure requirements and composition of the material used. When sealing chlorine, which exerts a pressure of 90 p.s.i.g. on the walls of the vessel at 72° F., I prefer to use sealing members comprised of Teflon (FEP) and at least .010" thick. Similarly, the actual structure or form of the vessel itself is not deemed to be significant. Hence, any of the more conventional tubular, cylindrical, hemispherical or elliptical storage vessels may also be employed.

While I have disclosed my invention solely in conjunction with two specific embodiments thereof, I do not intend to limit myself thereto, except as recited in the claims which follow.

I claim:

1. A self-sealing fluid storage vessel comprising a container, an inner wall of said container defining a fluid storage chamber, a plurality of adjacent overlapping deformable sealing elements collectively covering substantially the entire surface of said inner wall, each of said elements having a first portion and a second portion, said first portion of each element being attached to said inner wall and said second portion of each element being pendant from said first portion and the attached first portion of each of said sealing elements being overlapped by the pendant second portions of adjacent sealing elements.

2. The storage vessel as defined in claim 1 wherein each of said sealing elements is a rubber-like tubular element which generally corresponds to a transverse section of said chamber wall to which it is applied, one end of said tubular element corresponds to said first element portion and the other end of said element corresponds to said second portion.

3. The storage vessel defined in claim 1 wherein said sealing elements are rubber-like, are arranged in a series of overlapping rows, and the elements of one row are not aligned with the elements of the next adjacent row.

4. The storage vessel as defined in claim 3 wherein the elements of adjacent rows overlap one another by at least one half.

5. A self-sealing liquid halogen storage vessel comprising a container, said container having an inner wall defining a fluid storage chamber, a plurality of adjacent rows of discrete fluorocarbon polymeric sealing elements collectively covering substantially the entire surface of said inner wall, said elements each having first and second portions, said first portions being attached to said wall, said second portions being pendant from said first portions, and said second portions overlapping at least the first portions of the elements in the next adjacent row.

6. The storage vessel as defined in claim 5 wherein the elements overlap adjacent rows by at least one half.

7. The storage vessel as defined in claim 5 wherein said halogen is chlorine, said container has sufficient strength to withstand at least 5 atmospheres of internal pressure, and said fluorocarbon is a copolymer of tetrafluoroethylene and hexafluoropropylene.

References Cited

UNITED STATES PATENTS

| | | | |
|---|---|---|---|
| 2,754,992 | 7/1956 | Wilson | 220—63 |
| 3,291,333 | 12/1966 | House | 220—15 |

THERON E. CONDON, *Primary Examiner.*

G. T. HALL, *Assistant Examiner.*